(12) United States Patent
Raymond et al.

(10) Patent No.: US 7,913,057 B2
(45) Date of Patent: Mar. 22, 2011

(54) TRANSLATION LOOKASIDE BUFFER CHECKPOINT SYSTEM

(75) Inventors: Michael A. Raymond, Eagan, MN (US); Patrick John Donlin, Deephaven, MN (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 125 days.

(21) Appl. No.: 11/340,486

(22) Filed: Jan. 27, 2006

(65) Prior Publication Data

US 2007/0180217 A1 Aug. 2, 2007

(51) Int. Cl.
*G06F 12/00* (2006.01)
(52) U.S. Cl. ........ 711/205; 711/154; 711/162; 711/207; 707/821
(58) Field of Classification Search .................... 711/205
See application file for complete search history.

(56) References Cited

U.S. PATENT DOCUMENTS

| 5,255,384 | A | * | 10/1993 | Sachs et al. | 711/207 |
|---|---|---|---|---|---|
| 6,633,967 | B1 | * | 10/2003 | Duncan | 711/207 |
| 6,745,306 | B1 | * | 6/2004 | Willman et al. | 711/163 |
| 6,907,600 | B2 | * | 6/2005 | Neiger et al. | 717/139 |
| 7,287,124 | B2 | * | 10/2007 | Cohen | 711/135 |
| 7,529,897 | B1 | * | 5/2009 | Waldspurger et al. | 711/162 |
| 2005/0102396 | A1 | * | 5/2005 | Hipp | 709/224 |
| 2006/0004860 | A1 | * | 1/2006 | Liedes et al. | 707/104.1 |

* cited by examiner

*Primary Examiner* — Kevin L Ellis
*Assistant Examiner* — Matthew Bradley
(74) *Attorney, Agent, or Firm* — Sunstein Kann Murphy & Timbers LLP

(57) ABSTRACT

A system that, at a process checkpoint, pauses the process to copy the system state for the process and then copies pages of the process in memory to disk storage while the process continues to run. When a write to a page by the process is to occur that requires a translation from a virtual address to a physical address the write is intercepted. The page that is being modified is duplicated and then the process is allowed to modify the page and continue. The duplicate page is then stored as part of the checkpoint copy.

7 Claims, 5 Drawing Sheets

TRANSLATION LOOKASIDE BUFFER CHECKPOINT SYSTEM

BACKGROUND OF THE INVENTION

1. Field of the Invention

The present invention is directed to a system for copying a program state while the program continues to run and, more particularly, to a system that duplicates a page in memory that is about to be modified so that it can be saved in a condition before it is modified.

2. Description of the Related Art

For some computer programs if they fail before producing a solution to the problem that they are working on it can cost the user a great deal. This typically is the case when the program needs to run for several hours or days before a solution is reached. This cost comes from things such as lost time because the job needs to be completely run again and the price of electricity and for buying computing time on a machine can be expensive. One solution to this problem is a technique called Check Point Restart (CPR). Periodically the user pauses the execution of the program and a copy of all its state is made before resuming execution. If the program or computer crashes after the copy is made, execution can be restarted at the point when the copy was made instead of having to start again from the beginning.

For some programs the process of making a copy of their state can be prohibitive. These programs typically use a large amount of memory. Copies of all the memory must be made to nonvolatile storage before the program can resume. Because the memory is large but disks speeds are usually slow, it can take a long time to make the copy and the program must be stopped for an appreciable amount of time.

Another practice for CPR is for the computing program to be paused while all of its data is copied onto the storage device. This technique allows it and the utility program to execute simultaneously without risk that the computing program will modify its data before the utility program has a chance to copy it.

Another practice is for computing program to call an operating system routine such as UNIX's fork( ) or the equivalent function. This routine makes an exact duplicate of the program, including the process state, file descriptors, program memory space and program data space. The state of the duplicate is then copied to the storage device while the original continues execution. As part of the fork function, the operating system avoids making a full copy of the memory data by using a practice known as Copy On Write (COW). The duplicate process's program data space is shared with the original process space until either process modifies a memory page. At such time the page is duplicated with the Copy On Write. The fork process is slow, as the operating system must make a full copy of the virtual to physical memory mapping data known as page tables, regardless of Copy On Write pages.

What is needed is a system that improves upon these situations.

SUMMARY OF THE INVENTION

It is an aspect of the present invention to provide a system that will allow a state program to be copied while it continues to run.

It is another aspect of the present invention to intercept writes through a translation lookaside buffer so that a page that is to be modified can be duplicated for saving the program state.

The above aspects can be attained by a system that copies pages of a process at a checkpoint while the process continues to run. When a write to a page by the process is to occur the write is intercepted. The page that is being modified is duplicated and then the process is allowed to modify the page. The duplicate page is then stored as part of the checkpoint copy.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The embodiments of present invention addresses the above-discussed problems by pausing a job process when a check point or process state copy process for the job process is to be performed and then starting the copy process. The term "pause" is used for convenience to describe this state of the computing program as the computing program is temporarily prevented from running, however, in this paused situation, the system is actually typically performing exception handling and process control at the scheduler level in not typically being performed. Once the copy process is started and has copied the system state, the job process is released to continue running. The copy process then starts copying pages of the job process in page memory of the system one at a time and storing them in non-volatile storage in "parallel" with the running of the job process. If the job process attempts to modify (write to) any of the un-copied pages through the use of the system translation lookaside buffer (TLB), this attempt to modify a page is detected. The write attempt results in a processor exception fault, which transfers control of execution to a kernel exception handling function. A duplicate of the page that is to be modified is made, and placed in a temporary storage, and then the original page to be modified is allowed to accommodate write operations in via TLB. The processor returns from the exception handling back to the user program execution.

Figure 1:
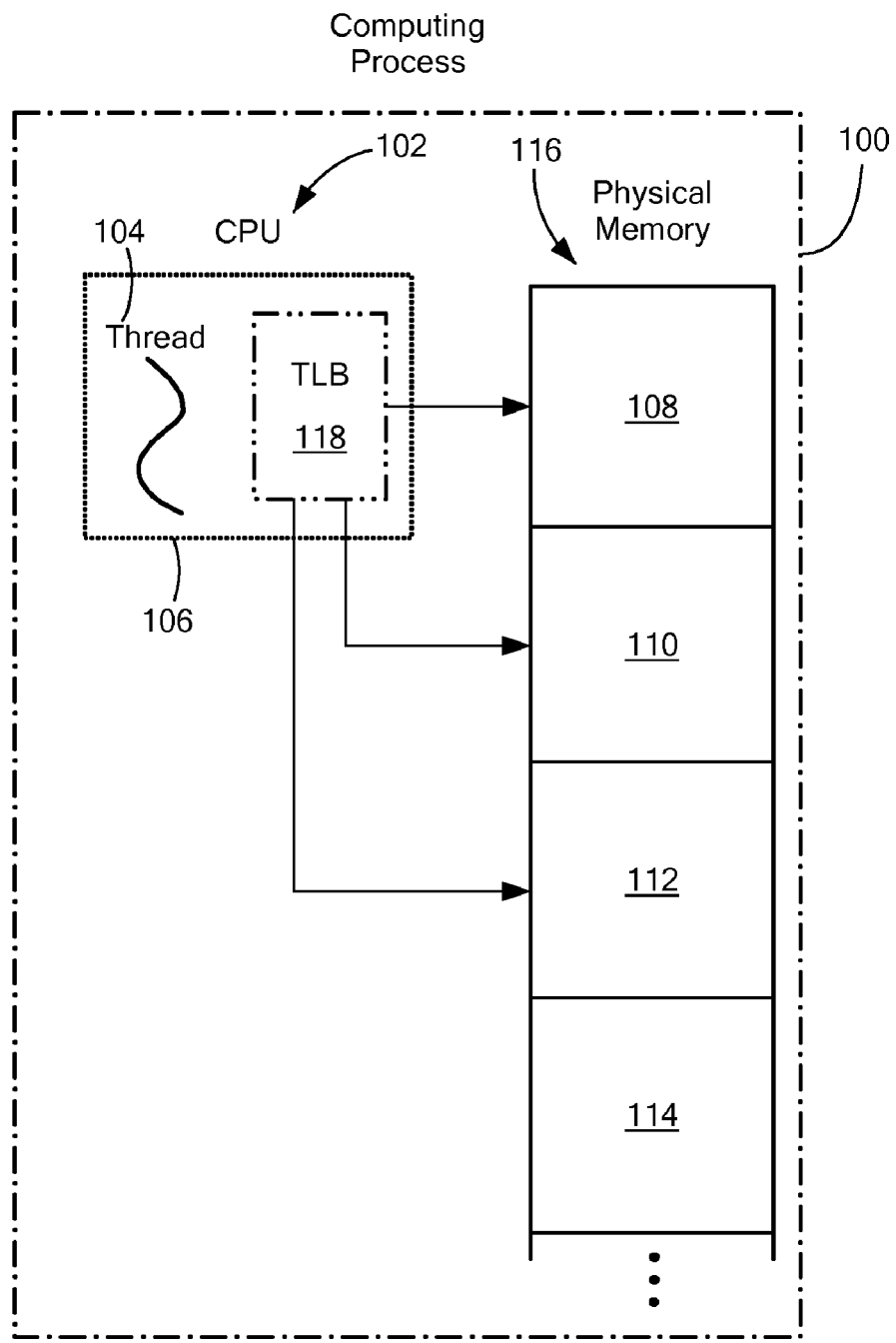
FIG. 1 illustrates a computing process accessing memory through a TLB.

FIG. 1 depicts a typical computing environment 100. A CPU 102 running a thread 104 within a job process or program 106 reads from and modifies (writes) data in pages 108-114 in a physical memory 116. The program virtual memory addresses for the reads/writes are translated to physical memory addresses through a Translation Lookaside Buffer (TLB) 118.

Figure 2:
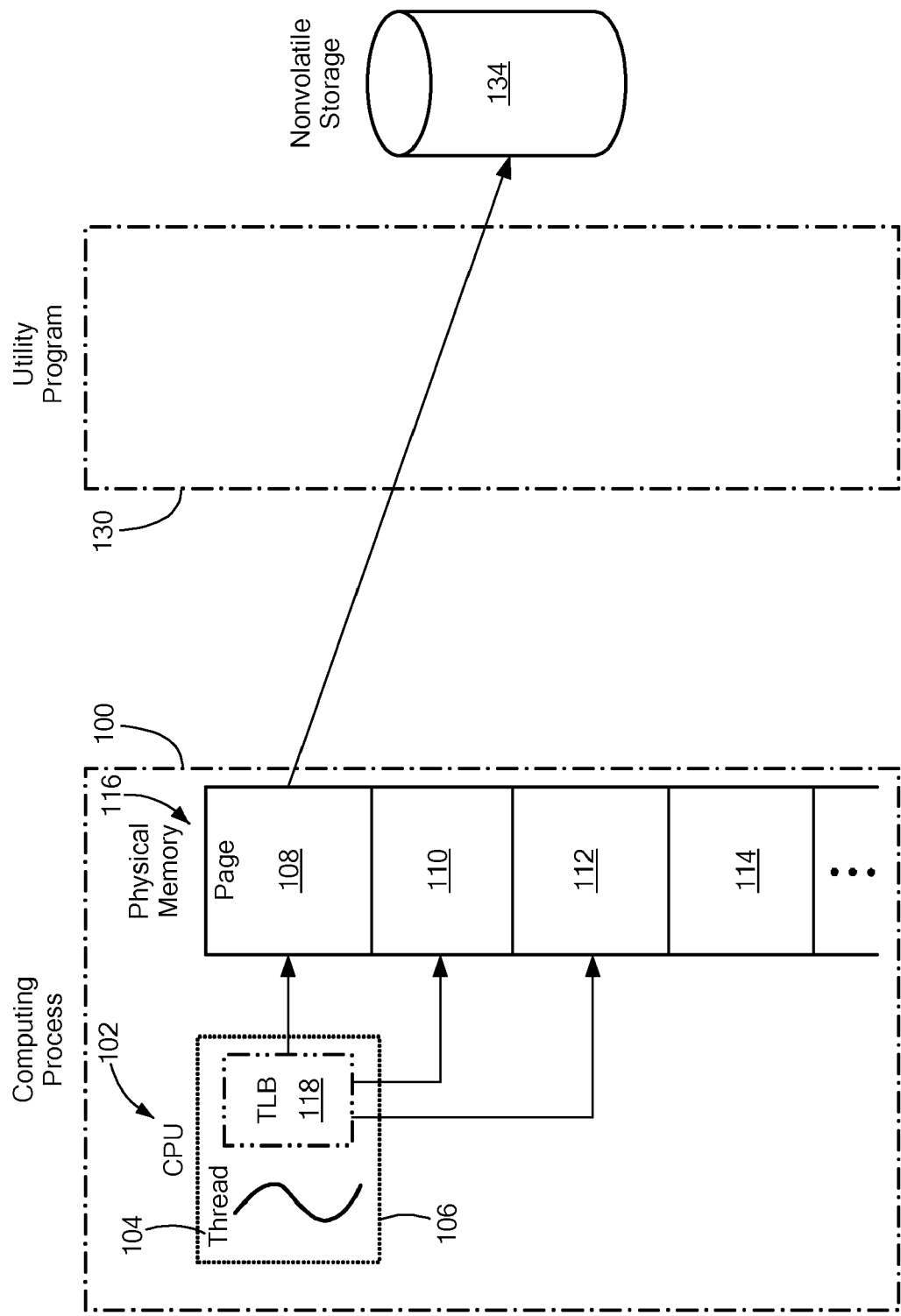
FIG. 2 shows a utility making a copy of a page of memory.

FIG. 2 shows a utility program 130 (the copy process) which copies the state (pages) of the original computing program 106 to nonvolatile storage 134, such as disk media. When a state copy is to be performed, the utility program 130 briefly pauses the computing program 106 to copy the operating system related meta data (not shown), such as open file descriptors and pending signals to the storage device 134. The program 130 then causes the operating system to modify the TLB data of the computing program 106 so that the TLB 118 will only allow read access by the computing program to the memory data (pages 108-114). The utility program 130 then un-pauses the computing program 106 and allows it to continue running. The utility program 130 begins the process of copying the memory data to the storage device.

Figure 3:
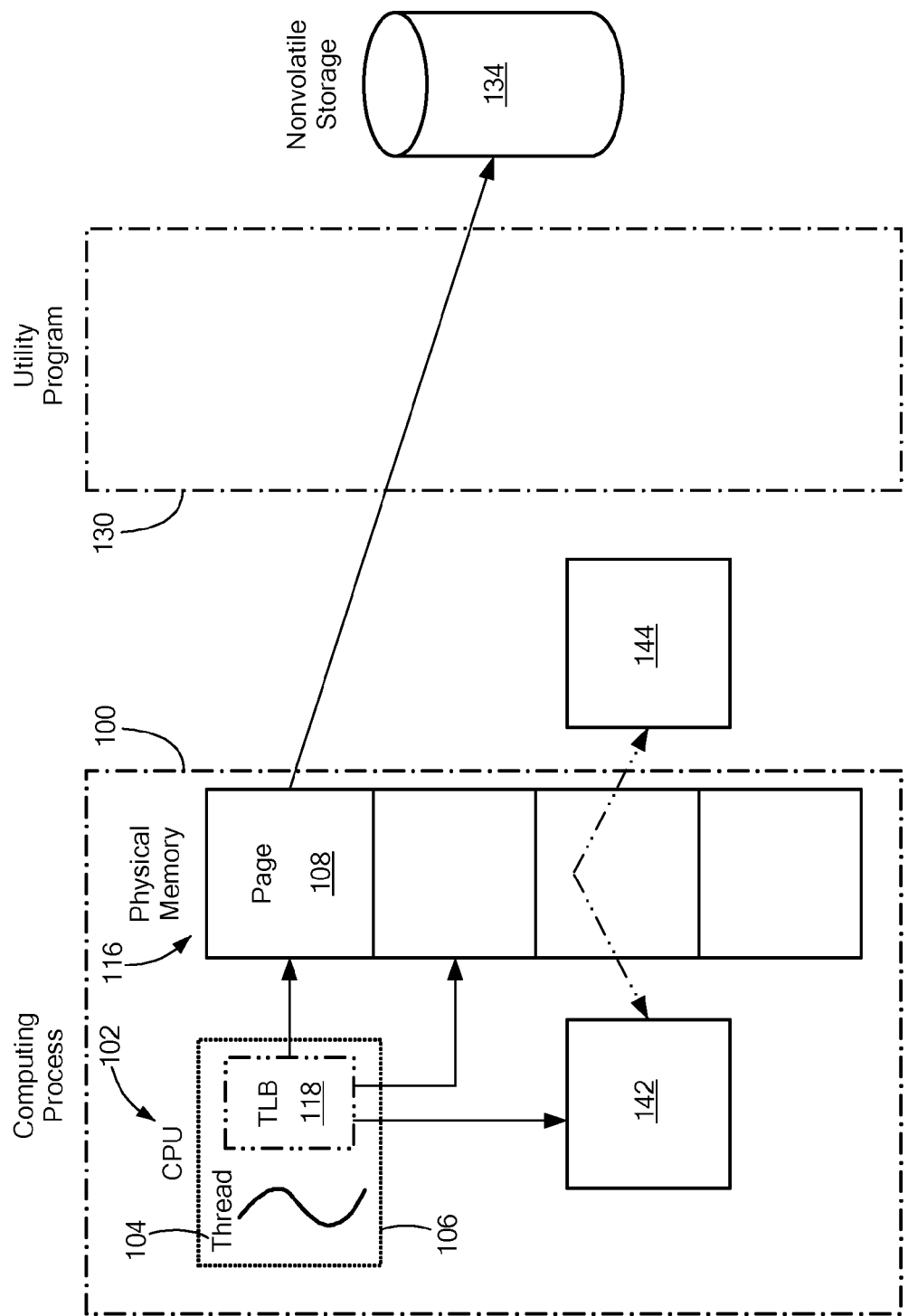
FIG. 3 shows a page being duplicated so that the compute process can continue to use the page.

FIG. 3 shows what happens when the computing program 106 tries to modify some of the memory data. Because the TLB data has been modified, the TLB prevents the write to memory 116 and triggers an operating system routine to handle the event. The operating system recognizes the situation and makes a copy of the original user data. One copy 142 is given or made available to the computing program 106 and the program 106 is allowed to modify the copy 142. The other or duplicate copy 144 is given to the utility program 130 to transfer to the storage device 134 (the disk storage 134).

Figure 4:
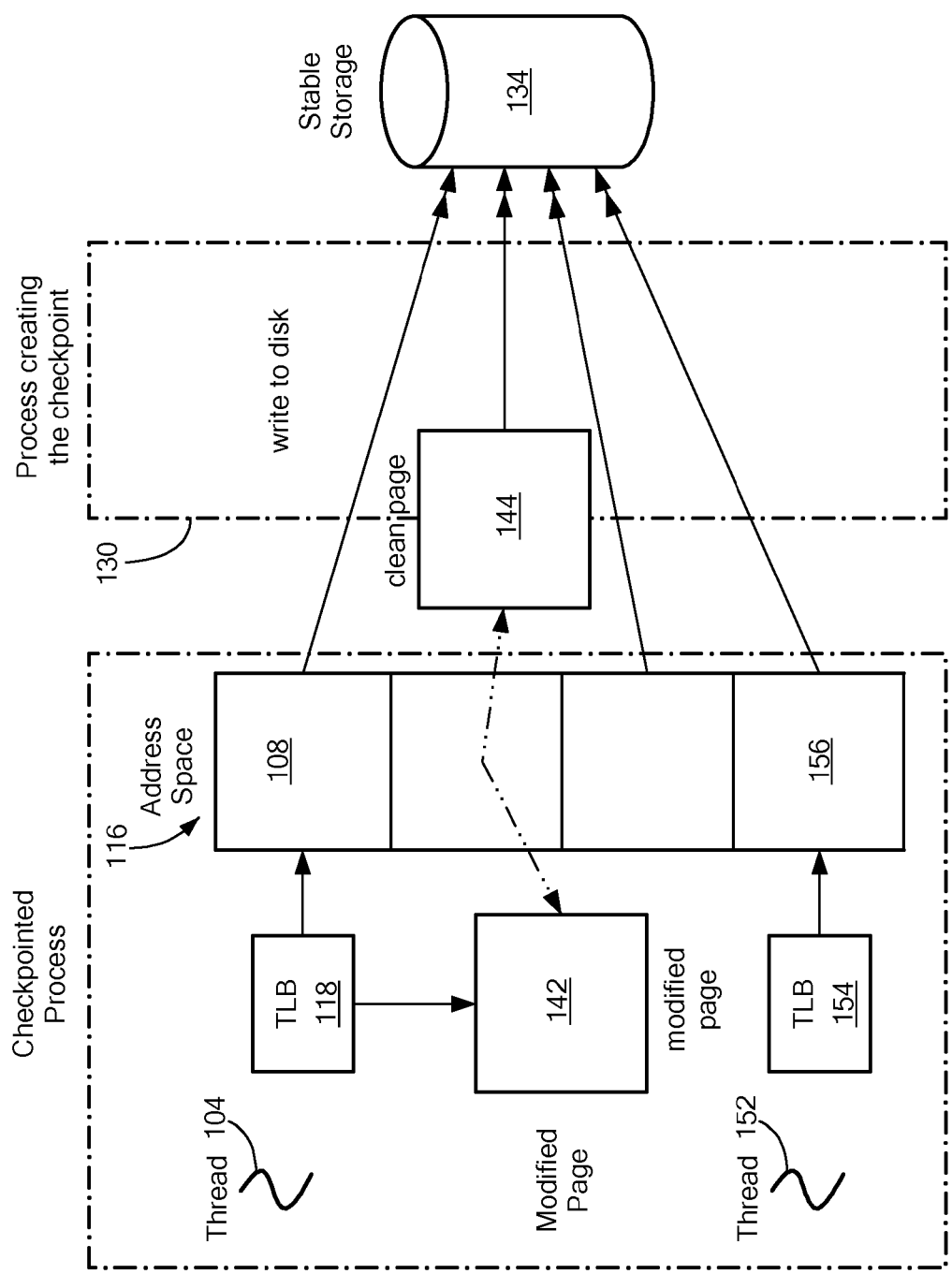
FIG. 4 depicts the instantaneous checkpoint via TLB of the invention running with other processes.

FIG. 4 depicts the operations of FIGS. 2 and 3 being performed while another thread 152 is interacting through TLB 154 with another page 156 in memory 116. That is, the present invention operates in an environment where many processes, threads, TLBs, pages, etc. are interacting.

Figures 5, 6:
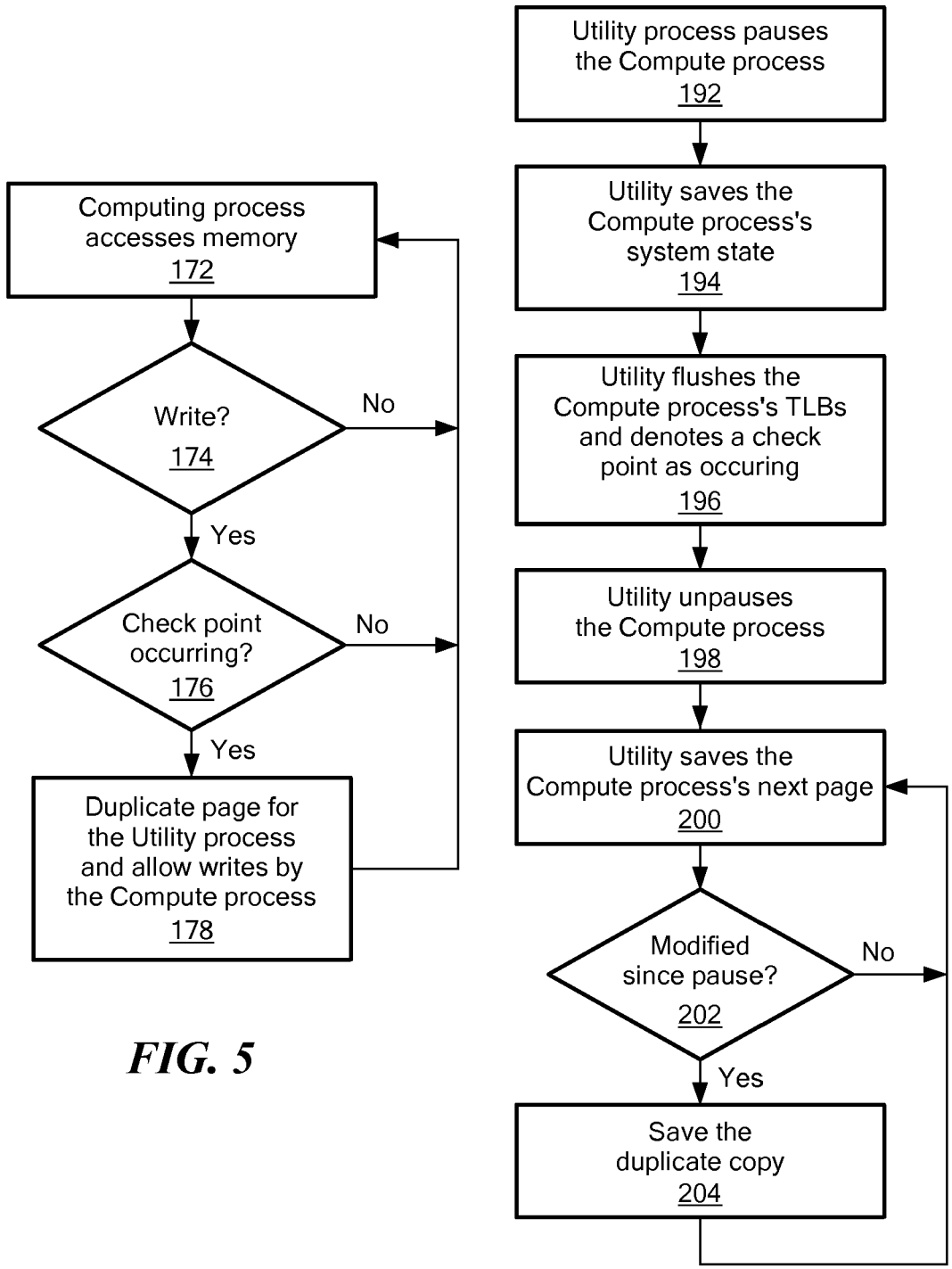
FIG. 5 shows the flow of the page duplicate operation.
FIG. 6 shows the flow of the copy utility.

The flowchart of FIG. 5 shows the computing process starting an access 172 to the memory. The access is examined 174 to determine if it is a write to the memory. If so, a determination is made 176 as to whether a checkpoint for the program process is occurring. If so, the page of memory being accessed for the write is duplicated 178 for saving to disk 134.

As depicted in FIG. 6, the utility pauses 192 the compute process and then saves 194 the system state. The content of the TLB for the compute process is flushed (deleted) 196 and a checkpoint flag is set. The compute process is released 198 and the utility saves 200 a next page of the compute process from page memory (at the beginning this is the first page). If the page has been modified 202 since the pause, the duplicate page is saved 204 to the disk 134 and then the utility loops to save 200 the next page.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for copying, to a non-volatile storage device, pages of modifiable data of a job process in a computer, the method comprising:
   starting a copy process in the computer, the copy process having access to the modifiable data; and
   in a translation lookaside buffer of the computer, detecting a write attempt, by the job process, to a given page of the modifiable data that has been unmodified since the copy process was started, wherein when such an attempt is detected, the translation lookaside buffer triggers an operating system routine that provides a duplicate copy of the given page to the copy process;
   allowing the job process to modify the page of modifiable data; and
   in the copy process, copying the duplicate copy of the given page to the storage device.

2. A method according to claim 1, wherein starting the copy process further comprises
   flushing the contents of the translation lookaside buffer.

3. A method according to claim 1, wherein starting the copy process comprises:
   pausing the job process without terminating it;
   copying and storing operating system related meta data in disk storage; and
   un-pausing the job process.

4. A method according to claim 3, wherein un-pausing the job process occurs after the copy process has copied to the storage device some but not all of the modifiable data of the job process.

5. A method for copying, to a non-volatile storage device, pages of modifiable data of a job process in a computer, the job process accessing the pages of modifiable data using a system translation lookaside buffer, the method comprising:
   pausing the job process without terminating it;
   flushing the translation lookaside buffer;
   when the job process initiates modification of a given page of modifiable data, configuring the translation lookaside buffer to execute an exception handling function that provides the given page to a copy process;
   un-pausing the job process; and
   before the job process terminates, copying to the storage device the pages of modifiable data by the copy process.

6. A method according to claim 5, wherein executing the exception handling function comprises:
   duplicating the data of the given page before the job process modifies it; and
   copying the duplicated data to the storage device.

7. A computer program product for copying, to a non-volatile storage device, pages of modifiable data of a job process in a computer, the computer program product comprising a tangible, computer-usable medium having computer readable program code thereon, the computer readable program code comprising:
   program code for starting a copy process in the computer, the copy process having access to the modifiable data;
   program code for detecting a write attempt by the job process to a page of modifiable data referenced in a translation lookaside buffer of the computer;
   program code for triggering, by the translation lookaside buffer after such an attempt is detected, an operating system routine that provides a duplicate of the page to the copy process; and
   program code for the copy process, including program code for copying the duplicate page to the storage device.

* * * * *